(12) United States Patent
Robinson et al.

(10) Patent No.: US 8,696,787 B2
(45) Date of Patent: Apr. 15, 2014

(54) BULK SYNTHESIS OF NANOPOROUS PALLADIUM AND PLATINUM POWDERS

(75) Inventors: David B. Robinson, Fremont, CA (US); Stephen J. Fares, Pleasanton, CA (US); Kim L. Tran, Livermore, CA (US); Mary E. Langham, Pleasanton, CA (US)

(73) Assignee: Sandia Corporation, Albuquerque, NM (US)

(*) Notice: Subject to any disclaimer, the term of this patent is extended or adjusted under 35 U.S.C. 154(b) by 145 days.

(21) Appl. No.: 13/417,876

(22) Filed: Mar. 12, 2012

(65) Prior Publication Data

US 2012/0186394 A1    Jul. 26, 2012

Related U.S. Application Data

(62) Division of application No. 12/371,821, filed on Feb. 16, 2009, now Pat. No. 8,157,886.

(60) Provisional application No. 61/066,398, filed on Feb. 19, 2008.

(51) Int. Cl.
*B22F 9/24*    (2006.01)
*B82Y 40/00*    (2011.01)

(52) U.S. Cl.
CPC . *B22F 9/24* (2013.01); *B82Y 40/00* (2013.01); *B22F 2301/25* (2013.01); *B22F 2304/054* (2013.01); *Y10S 977/896* (2013.01)
USPC ............................................ 75/371; 977/896

(58) Field of Classification Search
None
See application file for complete search history.

(56) References Cited

U.S. PATENT DOCUMENTS 6,531,304 B1* 3/2003 Bonnemann et al. ...... 435/173.9
2009/0311556 A1* 12/2009 Ganapathiraman et al. .. 428/800
2010/0008854 A1* 1/2010 Haam et al. .................. 424/1.61

* cited by examiner

*Primary Examiner* — George Wyszomierski
(74) *Attorney, Agent, or Firm* — Timothy P. Evans

(57) ABSTRACT

Disclosed is a method for providing nanoporous palladium and platinum powders. These materials were synthesized on milligram to gram scales by chemical reduction of tetrahalocomplexes with ascorbate in a concentrated aqueous surfactant at temperatures between −20° C. and 30° C. The prepared particles have diameters of approximately 50 nm, wherein each particle is perforated by pores having diameters of approximately 3 nm, as determined by electron tomography. These materials are of potential value for hydrogen and electrical charge storage applications.

6 Claims, 5 Drawing Sheets

BULK SYNTHESIS OF NANOPOROUS PALLADIUM AND PLATINUM POWDERS

CROSS-REFERENCE TO RELATED APPLICATION

This application is a divisional application of and discloses subject matter that is related to subject matter disclosed in parent application U.S. Ser. No. 12/371,821 filed Feb. 16, 2009 now U.S. Pat. No. 8,157,886 issued Apr. 17, 2012, and entitled "BULK SYNTHESIS OF NANOPOROUS PALLADIUM AND PLATINUM POWDERS." The present application claims the priority of its parent application which further claimed the priority under 35 U.S.C. §119(e)(1) of co-pending provisional application Ser. No. 61/066,398, filed Feb. 19, 2008 entitled "SYNTHESIS OF NANOPOROUS PALLADIUM." Both the parent application and the provisional application are incorporated herein by reference.

STATEMENT OF GOVERNMENT INTEREST

The United States Government has a paid-up license in this invention and the right in limited circumstances to require the patent owner to license others on reasonable terms as provided for by the terms of contract No. DE-AC04-94AL85000 awarded by the U.S. Department of Energy to Sandia Corporation.

TECHNICAL FIELD OF THE INVENTION

This present invention pertains to a method for the manufacture of nanoporous palladium and platinum powders. More particularly, this invention pertains to the synthesis of palladium and platinum powders having particle diameters of approximately 50 nm, wherein each particle is perforated by a plurality of approximately 3 nm pores. Such materials are of potential value for hydrogen isotope storage and electrical charge storage applications.

BACKGROUND

Palladium and platinum are of well known value for applications in catalysis, hydrogen storage, and electrochemistry (Lewis, F. A., *International Journal of Hydrogen Energy*, 1996, v.21(6): pp. 461-464). Interfacial interactions can often limit performance so a high surface area material is usually desired. In these cases, as a practical maximum, every point in the material particle would be ideally within a few atoms of an interface. Such materials would exhibit high double-layer capacitance, higher reaction rates in kinetically limited interfacial reactions, and in the case of palladium, rapid charging with hydrogen. When the hydrogen isotope is tritium, the helium decay product is more likely to diffuse out of the particle, limiting the formation of bubbles that can compromise mechanical properties. Porous platinum and palladium thin films have been fabricated by electrochemical deposition in a surfactant template (cf. Attard, G. S.; Bartlett, P. N.; Coleman, N. R. B.; Elliott, J. M.; Owen, J. R.; Wang, J. H. *Science* 1997, v.278: pp. 838; Bartlett, P. N.; Gollas, B.; Guerin, S.; Marwan, J. *Physical Chemistry Chemical Physics*, 2002, v.4: pp. 3835; Choi, K. S.; McFarland, E. W.; Stucky, G. D. *Advanced Materials*, 2003, v.15: pp. 2018; Denuault, G.; Milhano, C.; Pletcher, D. *Physical Chemistry Chemical Physics*, 2005, v.7: pp. 3545; Elliott, J. M.; Attard, G. S.; Bartlett, P. N.; Coleman, N. R. B.; Merckel, D. A. S.; Owen, J. R. *Chemistry of Materials*, 1999, v.11: pp. 3602; Elliott, J. M.; Owen, J. R., *Physical Chemistry Chemical Physics*, 2000, v.2: pp. 5653), and films of porous nickel (the remaining Group 10 metal) have been formed by electrodeposition followed by dealloying (cf. Sun, L.; Chien, C. L.; Searson, P. C. *Chemistry of Materials*, 2004, v.16: pp. 3125). Furthermore, bulk powders of porous nickel can be formed conveniently through chemical reduction of nickel salts around a surfactant template (cf. Yamauchi, Y.; Yokoshima, T.; Momma, T.; Osaka, T.; Kuroda, K. *Journal of Materials Chemistry*, 2004, v.14: pp. 2935; Yamauchi, Y.; Momma, T.; Yokoshima, T.; Kuroda, K.; Osaka, T., *Journal of Materials Chemistry*, 2005, v.15: pp 1987; Yamauchi, Y.; Yokoshima, T.; Momma, T.; Osaka, T.; Kuroda, K., *Electrochemical and Solid State Letters*, 2005, v.8: pp. C141) and bulk platinum and palladium nanostructures have been achieved by radiolytic (cf. Surendran, G.; Ramos, L.; Pansu, B.; Prouzet, E.; Beaunier, P.; Audonnet, F.; Remita, H., *Chemistry of Materials*, 2007, v.19: pp. 5045) and chemical metal reduction in soft templates (cf. Kijima, T.; Yoshimura, T.; Uota, M.; Ikeda, T.; Fujikawa, D.; Mouri, S.; Uoyama, S., *Angewandte Chemie—International Edition*, 2004, v.43: pp. 228; Solla-Gullon, J.; Montiel, V.; Aldaz, A.; Clavilier, J. *Journal of the Electrochemical Society*, 2003, v.150, E104; Teng, X. W.; Liang, X. Y.; Maksimuk, S.; Yang, H. *Small*, 2006, v.2: pp. 249).

Other relevant methods include assembly of nanoparticles in a block copolymer (cf. Warren, S. C.; Messina, L. C.; Slaughter, L. S.; Kamperman, M.; Zhou, Q.; Gruner, S. M.; DiSalvo, F. J.; Wiesner, U., *Science*, 2008, v.320: pp. 1748) and reduction in mesoporous silica (cf. Shin, H. J.; Ko, C. H.; Ryoo, R. *Journal of Materials Chemistry*, 2001, v.11: pp. 260; Kang, H.; Jun, Y.; Park, J. I.; Lee, K. B.; Cheon, J., *Chemistry of Materials*. 2000, v.12: pp. 3530). These previous approaches have brought disadvantages in scalability, safety, purity, versatility, and/or pore density.

We present a convenient pathway that is satisfactory in all of these criteria, resulting in Pd and Pt nanopowders with 2 nm-3 nm pores that we have produced in gram-scale batches.

SUMMARY

The invention then comprises a method for providing nanoporous palladium and platinum powders.

It is, therefore, an object of this invention to provide palladium and platinum powders having an average particle size of about 80 nm or less, wherein each particle comprises a plurality of nanopores approximately 2 nm-3 nm in diameter.

It is also an object of this invention to provide a method for preparing nanoporous palladium and platinum powders using a reducing agent which does not introduce metal boride impurities.

It is yet another object of this invention to provide a method for slowing the reaction for reducing palladium and platinum so that the reaction does not occur on the timescale of constituent mixing and so that microscopic conditions are as uniform as possible.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention and together with the description serve to explain the principles of the invention.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF EMBODIMENTS OF THE INVENTION

Figure 1A:
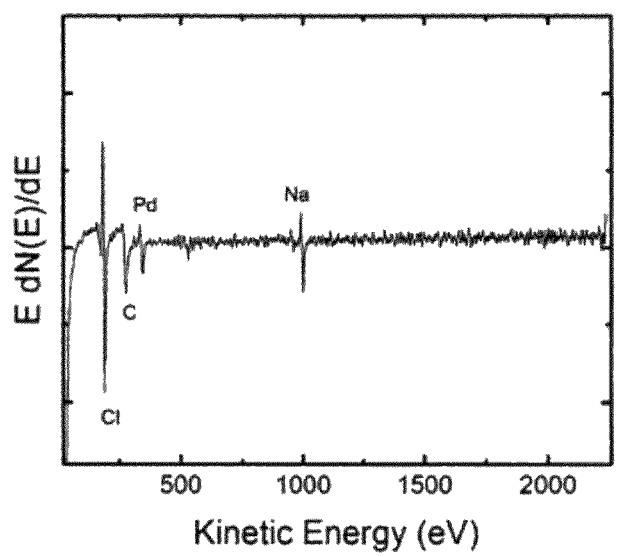
FIG. 1A shows an Auger spectrum of a palladium sample rinsed in ethanol.

We describe herein a method to provide nanoporous palladium and platinum which avoids the shortcomings of the prior art.

Materials: Palladium black, ammonium tetrachloropalladate, ammonium tetrachloroplatinate, and palladium(II) chloride were purchased from Alfa (Alfa. Aesar, Ward Hill, Mass.). BRIJ® 56 (a polyethylene glycol hexadecyl ether surfactant, e.g., $C_{16}H_{33}(OCH_2CH_2)_nOH$, where n is about 10), sodium chloride, ammonium chloride, ascorbic acid; hydrochloric acid, and ammonium hydroxide were all purchased from Aldrich (Sigma-Aldrich Co., St. Louis, Mo.). All materials were used as received and 18 MΩ deionized water was prepared in the laboratory.

Metal salt pastes: 17.7 mg of palladium(II) chloride (0.1 millimole) and 47.0 mg of sodium chloride (0.8 millimole) were added to 0.4 mL of deionized water and heated to 80° C. in a water bath. All solids dissolved, forming a brown solution. Alternatively, 28.4 mg of ammonium tetrachloropalladate was dissolved in the same volume of water, with no added sodium chloride, and heated to 80° C. For platinum, 37.3 mg ammonium tetrachloroplatinate was dissolved in 0.3 mL water and 0.1 mL 4M hydrochloric acid, and heated to 80° C. In addition, other alkali metal ammonium chlorides or bromides and their complexes with palladium or platinum can be used. In each case, 0.66 mL of BRIJ® 56, previously melted in the water bath, was added to the solution and mixed by shaking or preferably with a vortex mixer until the paste becomes too viscous to agitate easily. Heating and mixing cycles (typically 3) were continued until a homogenous brown paste is formed. The paste was left on the bench to cool to room temperature, and then placed in a −20° C. freezer.

Reducing paste: 14.4 μL concentrated ammonium hydroxide (about 30%, 0.214 millimole) and 41.9 mg ascorbic acid (0.238 millimole) or a similar formulation of buffered ascorbate were dissolved in 0.186 mL water, and heated to 80° C. 0.33 mL BRIJ® 56 was added, and the mixture homogenized and cooled as above, resulting in a white paste.

Porous metal particles: Pastes cooled to −20° C. were kneaded together with ceramic spatulas for several minutes in a casserole dish that also had been cooled to −20° C. No color change in the pastes was seen at this point. Equal amounts of the kneaded paste were loaded into two 50 mL centrifuge tubes and returned to the freezer. One day later, the tubes were moved to a 4° C. refrigerator, and left for 2 days. The pastes were stirred and then left for 1 day at room temperature, and gradually turned black over these 4 days. In the case of platinum, no cooling below room temperature was necessary, and the preferred reaction time was 2 weeks.

To remove the surfactant and byproducts, the tubes were filled with ethanol and heated to 80° C. with intermittent vortexing and sonication. This dissolved the paste, leaving a black suspension. Solids were separated by centrifugation at 6000 rpm, and the faintly yellow supernatant was decanted. The black material was resuspended in 50 mL water, heated to 80° C. for 10 minutes, and centrifuged again. The material easily resuspends in water, so it was decanted carefully, leaving approximately 1 mL. This step was repeated one more time with ethanol. Higher yields can be obtained using preferably two rinses of a solution comprising 3 parts (by volume) ethanol to 1 part (by volume) water. The procedure has been tested on scales ranging from 0.1 millimole to 5.5 millimoles. We have been able to purify up to 1 millimole per centrifuge tube.

In this approach, metal salts in the aqueous phase are reduced to metal particles that grow around hexagonally packed surfactant cylinders. When the surfactant is washed away, a pore remains. Careful choice of reducing agent and conditions allows extended growth of particles without disturbing the surfactant structure and minimizes incorporation of impurities.

At room temperature, mixing the palladium and ascorbate pastes results in immediate reaction; the mixture turns gray or black in patches. It is preferable to slow the reaction so that it does not occur on the timescale of mixing and that microscopic conditions are as uniform as possible. Adding 8 equivalents of sodium or ammonium chloride to the palladium paste (or 6 to the palladium paste and 3 to the ascorbate paste) slows the reaction rate sufficiently. This can also be achieved by reducing the temperature. The results reported here use both approaches although it is preferable to use primarily the latter, because it results in less material that must be removed during the isolation steps.

The reaction is exothermic, so care must be taken during mixing to keep the temperature low. For scales much larger than 1 gram, the use of chloride to slow the reaction may be preferable, but we obtained satisfactory results by kneading on a cold, nonporous surface. Platinum must be kept acidic to suppress reaction with oligo(ethylene oxide) at the elevated temperatures needed to prepare the paste. Under these conditions, reduction by ascorbic acid is slow, so added salt and reduced temperature are less important. The palladium reaction also can be performed under acidic conditions without cooling below room temperature, but it proceeds more quickly at higher pH. Keeping the pH near the $pK_a$ of ascorbate helps ensure that the reaction rates at the start and end of the reaction are comparable, allowing high yield to be achieved in a relatively short time.

Figure 1B:
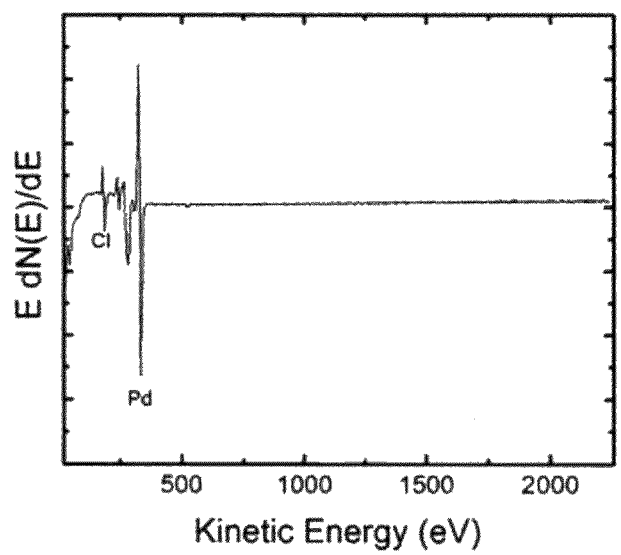
FIG. 1B shows an Auger spectrum of a palladium sample rinsed in ethanol, then in water, and then again in ethanol.
Figure 2:
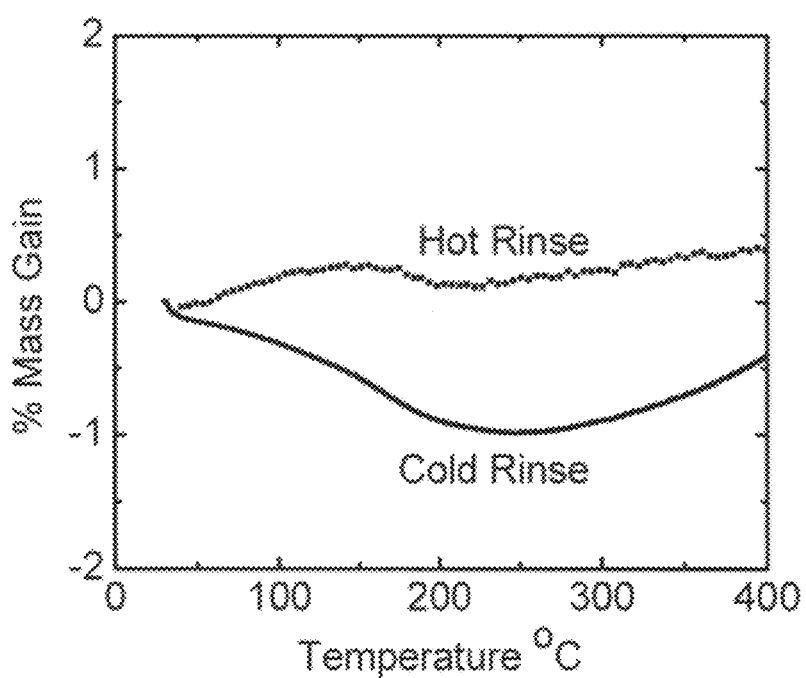
FIG. 2 illustrates a thermo-gravimetric analysis (TGA) of nanoporous palladium in air, rinsed in room temperature ethanol and water (cold rinse, 1 K/min); and in air, rinsed in heated ethanol and water (hot rinse 2 K/min).

Cleaning the product is challenging given the high surface area, pore aspect ratio, and reactivity of a bare palladium surface. Ethanol efficiently removes nearly all of the surfactant, but washing with water (or an ethanol-water mixture) is required to remove salts, as illustrated in the Auger spectra shown in FIGS. 1A and 1B. When washes are performed at room temperature, thermogravimetric analysis shows mass losses in the 1% range under air at 180° C.-200° C., suggesting the presence of organic contaminants. This number is several times smaller if the washing steps are heated as shown in FIG. 2. As a point of reference, if pores are assumed to be spaced by one diameter, one would expect about 20% of the material's volume to be pores, and palladium is 10 times denser than typical organic material, so clogged pores would be expected to show a 2% mass loss in the air analysis.

Figure 3A:
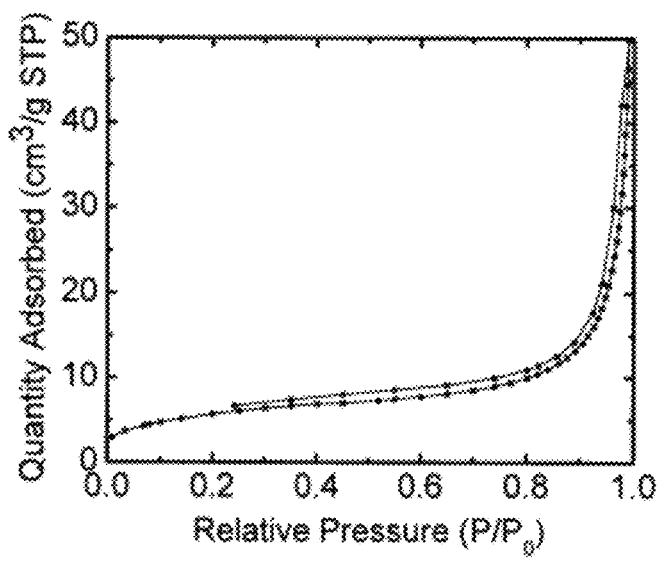
FIG. 3A illustrates nitrogen adsorption isotherms of palladium made by the present method at 77 K after a degassing step at 50° C. for 5 hours.
Figure 3B:
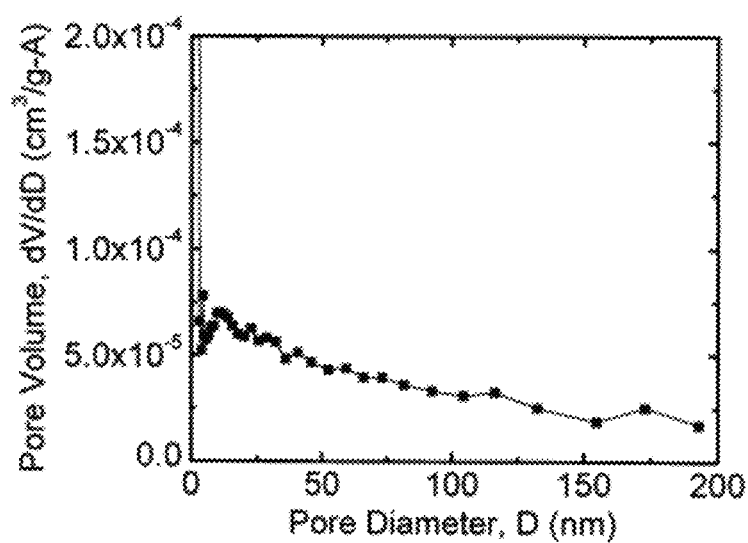
FIG. 3B illustrates the pore size distributions of a palladium powder made by the present method. A sharp peak below 2 nm corresponds to the porosity incorporated in the palladium particles, while the broader distribution of pore size reflects the spacing between particles.
Figure 3C:
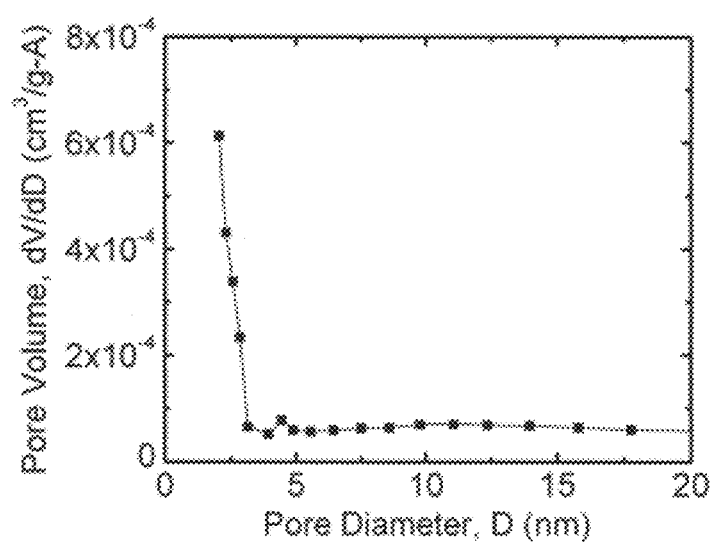
FIG. 3C shows an expanded view of the pore size distribution shown in FIG. 3B in order to show details of the peak at about 2 nm which demonstrates that these pores are accessible to the gas.

BET surface area measurements, shown in FIG. 3A, were performed with an ASAP 2020 Accelerated Surface Area and Porosimetry Analyzer (obtained from Micromeritics Instrument Corporation, Norcross, Ga.) using nitrogen as the analytic gas at 77 K. Prior to analysis, samples were de-gassed under vacuum for several hours at 50° C. FIG. 3B shows the pore size distributions of a quantity of palladium powder made by the present method, wherein the sharp peak below 2 nm corresponds to the porosity incorporated in the palladium particles. The broader distribution of pore size reflects the spacing between particles. FIG. 3C shows an expanded view of the same pore distribution up to 20 nm and more clearly shows the 2 nm peak. The presence of this peak demonstrates that the pores are accessible to the measuring gas.

Figure 4:
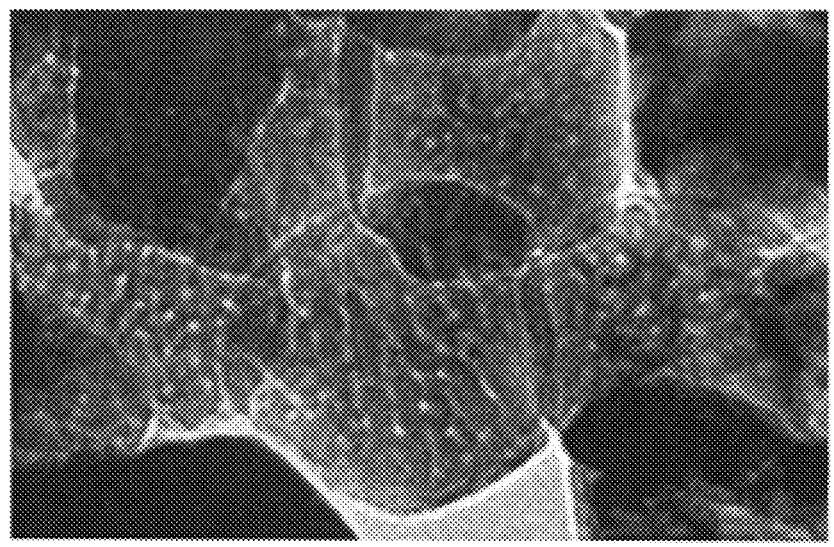
FIG. 4 shows a transmission electron microscope (TEM) image of nanoporous palladium powder made by the present method.

Pore geometry can be elucidated using transmission electron microscopy and tomography. FIG. 4 shows particles imaged at zero tilt angle, showing faceted particles in the 50 nm range that are perforated by 2-3 nm pores arranged with a degree of regularity and density but not close-packed.

To demonstrate that the high-contrast regions shown in FIG. 4 are pores that go through the entire particle, scanning transmission electron micrographs were collected at several angles and reconstructed to form a three-dimensional representation of several particles. A series of 1 nm slices through this reconstructed view are shown in FIGS. 5A-5F, and show pores that nm the length of the particle, with slight irregularities in their path.

Figure 6:
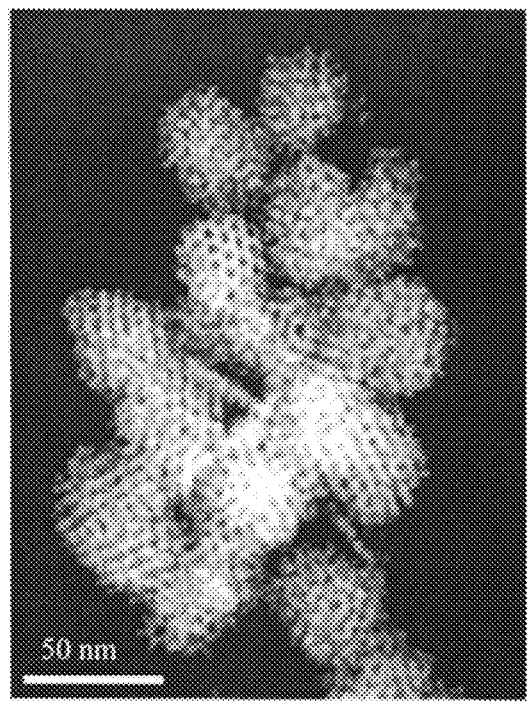
FIG. 6 shows a STEM image of nanoporous platinum powder made by the process of the present method.
Figure 5A:
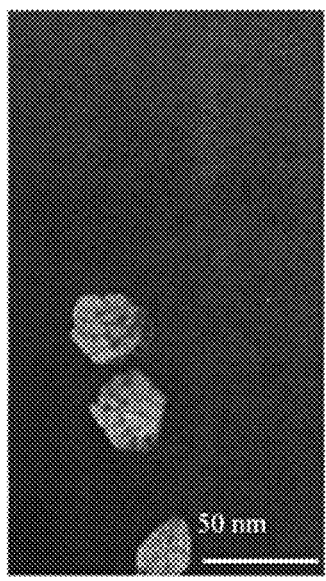
FIG. 5A-5F shows 1 nm-thick slices through the reconstruction of a 3-dimensional reconstructed volume rendering of an original STEM image of a palladium particle: all of the slices demonstrate the porosity is tortuous and extends throughout the particles in all directions.
Figure 5B:
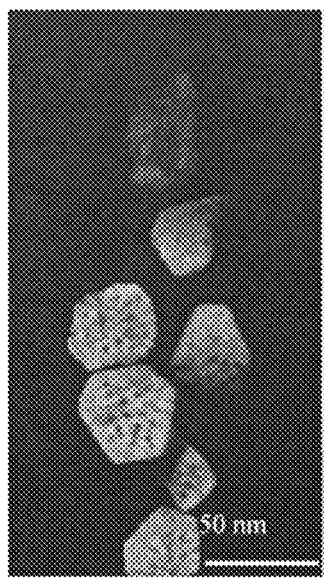
Figure 5C:
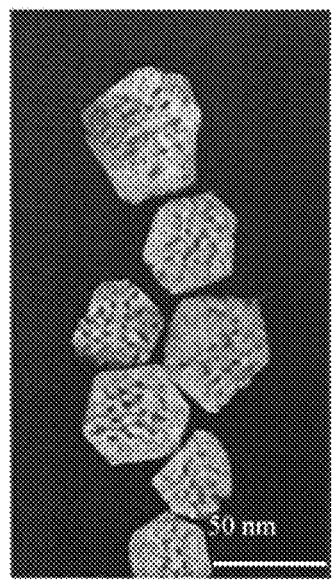
Figure 5D:
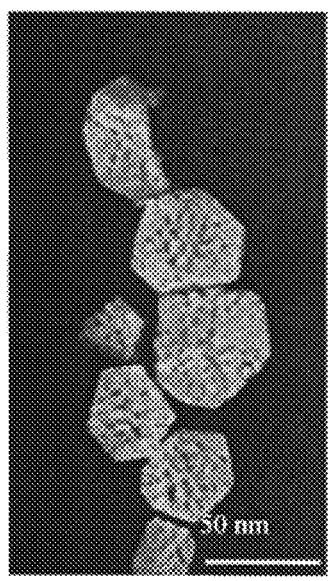
Figure 5E:
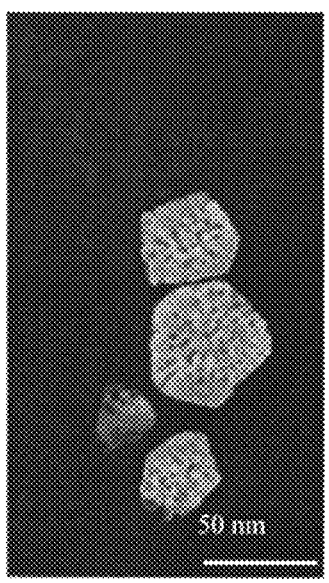
Figure 5F:
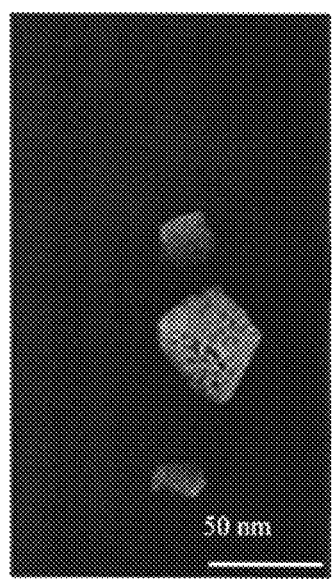

FIG. 6 shows a micrograph of platinum particles produced by the procedure described in the experimental section, showing a greater degree of pore regularity. Palladium produced under the more acidic conditions used for platinum looks essentially the same as in FIG. 4.

Several effects may contribute to the observed pore density differences between the two metals. Electroplated palladium in purified surfactant shows regular pores, but the more constrained environment of a film may make regularity easier to maintain than in a free particle. We suspect that the surfactant assembly is perturbed by concentration gradients of reactants and products, which are exacerbated by higher reaction rates; recall that the platinum reaction proceeds much more slowly. Specific interactions between the particle surface and the products or surfactants may influence the arrangement of surfactant molecules, an effect that would be more pronounced in a suspended particle than a film. The difference between our palladium and other results also may depend on the aspect ratio of the product. The tilted platinum particles in FIG. 6 suggest a thinner product than the palladium particles, as is consistent with other reports. We can expect pore regularity to be more likely over shorter distances. If true, this effect may mean that attempts to grow particles larger than about 50 nm will produce less regular pores, resulting in a practical upper limit on particle size. By seeding particle growth by mixing a half batch of previously formed particles into the metal paste before adding the reducing paste, we were able to produce 80 nm diameter particles with similar pore size and density to the seed particles, so we have not yet observed such an upper limit.

The material presented herein is practical to prepare at useful scales and is of potential benefit to hydrogen isotope storage, electrical energy storage, and catalysis applications due to the high exposed surface area provided by the observed high density of small pores. We anticipate that surfactant templates such as BRIJ® 56 may result in the highest practical surface areas for porous noble metals: for smaller pores, high pore surface energy and mobility may result in pore collapse at low temperatures. Results reported here show that the 2 nm-3 nm pores in palladium and platinum are stable at 80° C.

Having thus described exemplary embodiments of the present invention, it should be noted by those skilled in the art that the disclosures herein are exemplary only and that various other alternatives, adaptations, and modifications may be made within the scope of the present invention. Accordingly, the present invention is not limited to the specific embodiments as illustrated herein, but is only limited by the following claims.

Finally, to the extent necessary to understand or complete the disclosure of the present invention, all publications, patents, and patent applications mentioned herein are expressly incorporated by reference therein to the same extent as though each were individually so incorporated.

We claim:

1. A method for providing a finely divided platinum metal powder, comprising the steps of:
   a. forming a first paste, comprising a first aqueous mixture of an ammonium or an alkali metal tetrachloroplatinate, hydrochloric acid and a polyethylene glycol hexadecyl ether surfactant;
   b. forming a second paste comprising a second aqueous mixture of ammonium hydroxide and ascorbic acid and a polyethylene glycol hexadecyl ether surfactant;
   c. kneading the first and second pastes together on a surface to form a mixed paste;
   d. forming a liquid suspension of the mixed paste in a heated polar solvent;
   e. separating the liquid suspension into a precipitated solid and a supernatant;
   f. recovering the precipitated solid; and
   g. drying the precipitated solid in a vacuum or an inert atmosphere thereby providing a finely divided powder of platinum metal.

2. The method of claim 1, wherein the step of forming the first paste further comprises the steps of:
   a. dissolving a first quantity of an ammonium or an alkali metal tetrachloroplatinate into a first volume of water together with more than one equivalent of hydrochloric acid to provide a first aqueous mixture;
   b. heating the first aqueous mixture to about 80° C. to form a first solution;
   c. melting a first quantity of a polyethylene glycol hexadecyl ether surfactant and adding it to the first solution to provide a second aqueous mixture;
   d. agitating the second aqueous mixture to form a first paste;
   e. heating the first paste to about 80° C. to form a viscous liquid; and f. repeating steps d.) and e.) until the viscous liquid is rendered homogeneous.

3. The method of claim 1, wherein the step of forming the second paste further comprises the steps of:
   a. dissolving a first quantity of ammonium hydroxide and ascorbic acid into a second quantity of water to provide a third aqueous mixture;
   b. heating the third aqueous mixture to about 80° C.;
   c. melting a quantity of a polyethylene glycol hexadecyl ether surfactant and adding it to the third aqueous mixture to form a reductant mixture;
   d. agitating the reductant mixture to form a second paste;
   e. heating the second paste to about 80° C. to form a viscous reducing liquid; and
   f. repeating steps d.) and e.) until the viscous reducing liquid is rendered homogeneous.

4. The method of claim 1, wherein the steps of forming a liquid suspension of the mixed paste separating the liquid suspension into a precipitated solid and a supernatant and recovering the precipitated powder comprise the steps of:
   a. adding a quantity of ethanol to the mixed paste and heating ethanol/mixed paste combination to about 80° C.;
   b. mixing and agitating the ethanol/mixed paste combination to dissolve the mixed paste providing thereby a liquid suspension;
   c. separating the liquid suspension into a precipitated solid and a supernatant;
   d. decanting the supernatant;
   e. resuspending the precipitated solid in water to form an aqueous suspension and heating the aqueous suspension to about 80° C.;
   f. repeating steps c.) and d.); and
   g. repeating steps a.) through d.).

5. The method of claim 1, wherein the steps of forming a liquid suspension of the mixed paste separating the liquid suspension into a precipitated solid and a supernatant and recovering the precipitated powder comprises the steps of:
   a. adding a quantity of a solvent solution comprising ethanol and water to the mixed paste and heating this solvent solution-mixed paste combination to about 80° C.;
   b. mixing and agitating the solvent solution-mixed paste combination to dissolve the mixed paste thereby providing a liquid suspension;
   c. separating the liquid suspension into a precipitated solid and a supernatant;
   d. decanting the supernatant; and
   e. repeating steps a.) through d.).

6. The method of claim 5, wherein the solvent solution comprises 3 parts by volume ethanol to 1 part by volume water.

* * * * *